United States Patent [19]

Brinkers

[11] Patent Number: 5,223,300
[45] Date of Patent: Jun. 29, 1993

[54] METHOD FOR PREPARING A SPREAD CONTAINING LACTOPROTEIN AND/OR VEGETABLE PROTEIN AND THICKENER

[75] Inventor: Bernardus H. C. Brinkers, Wassenaar, Netherlands

[73] Assignee: Koninklejke Brinkers Margarinefabrieken B.V., Zoetermeer, Netherlands

[21] Appl. No.: 775,297

[22] Filed: Oct. 9, 1991

[30] Foreign Application Priority Data

Oct. 10, 1990 [NL] Netherlands .................... 9002204
Feb. 19, 1991 [NL] Netherlands .................... 9100290

[51] Int. Cl.$^5$ .............................................. A23D 7/00
[52] U.S. Cl. ................................... 426/603; 426/663
[58] Field of Search ............................... 426/603, 663

[56] References Cited

U.S. PATENT DOCUMENTS 4,520,037  5/1985  Gould et al. ................. 426/330.6

FOREIGN PATENT DOCUMENTS 0297690  1/1989  European Pat. Off. .
0356094  2/1990  European Pat. Off. .
385542   9/1990  European Pat. Off. .
0385542  9/1990  European Pat. Off. .
8907893  9/1989  PCT Int'l Appl. .

OTHER PUBLICATIONS

S. Friberg, "Food Emulsions", Marcel Decker, Inc. 1976 pp. 297 and 300.

*Primary Examiner*—Joseph Golian
*Assistant Examiner*—Evan Federman
*Attorney, Agent, or Firm*—Deveau, Colton & Marquis

[57] ABSTRACT

A method is described for the preparation of a spread containing lactoprotein and/or vegetable protein and thickener, wherein, using a fat composition and a first aqueous composition as starting materials, the starting emulsion is first formed in a state in which the fat composition is entirely molten and a separately formed warm, thickener-containing, second aqueous composition is then emulsified in the starting emulsion at a temperature between 40° and 70° C. to form a final emulsion.

9 Claims, 1 Drawing Sheet

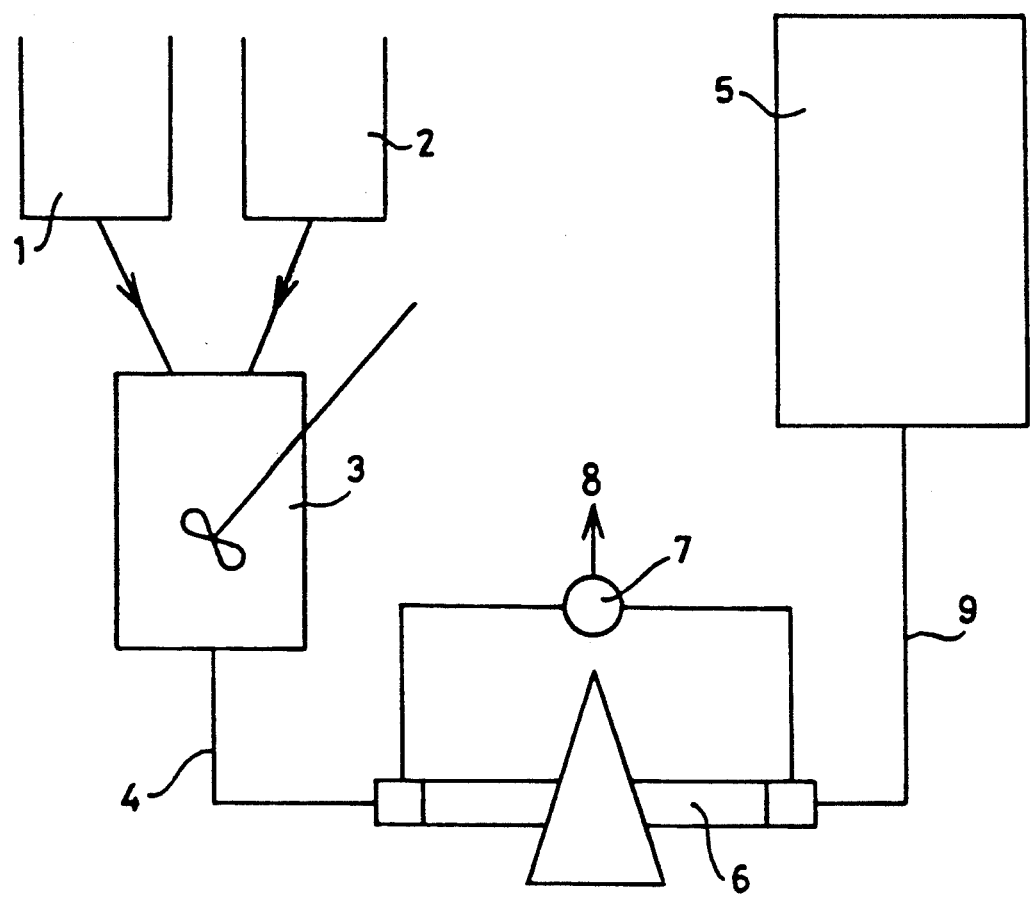

METHOD FOR PREPARING A SPREAD CONTAINING LACTOPROTEIN AND/OR VEGETABLE PROTEIN AND THICKENER

BACKGROUND OF THE INVENTION

The invention primarily relates to a method for the preparation of a spread containing lactoprotein and/or vegetable protein and thickener, in which an emulsion is formed which comprises a continuous fat phase and a discontinuous aqueous phase and in which all of the protein and thickener is present in the aqueous phase.

A method of this type is disclosed in Netherlands published Patent Application 177 729.

In the said publication it is described that in order to prepare a low-calorie spread, a solution of gelatine or the like in a protein-free aqueous medium in an amount, based on the total weight of the spread, which depends on the hardness of the fat used is first prepared. Another solution is then prepared in which lactoprotein is dissolved or dispersed. The two resulting solutions are then added together in such a way that the lactoprotein is not exposed to a temperature which is higher than 40° C. The combined aqueous composition thus obtained is then emulsified with a suitable plastic fat composition to obtain a water-in-oil emulsion, which is then cooled and further processed.

A method of this type has the disadvantage in that during the preparation of the combined aqueous composition great care must be taken with regard to the temperature; if the temperature rises above 40° C., in particular when the combined aqueous composition is in the lower pH range, it will be possible for the protein to flocculate out, as a consequence of which the mouth feel of the spread subsequently obtained will be adversely affected.

The temperature must also be carefully controlled during the subsequent formation of the total emulsion; the temperature may then be 30° C. to 60° C., but may only be a maximum of 50° C. if the pH value of the aqueous phase is no higher than 5.2 and if no defloccu- lating agents are present.

The aim of the present invention is to provide a method which is much less sensitive in respect of the temperature control, so that formation of a product of lesser quality is substantially avoided.

SUMMARY OF THE INVENTION

According to the invention, the method of the indicated type is characterized in that a spread having a fat content of up to 85% by weight is prepared as follows:

a) a starting emulsion is formed from a selected, entirely molten, fat composition in which an emulsifier has been incorporated and a suitable first aqueous composition comprising lactoprotein and/or vegetable protein, b) a warm second aqueous composition is formed which comprises a suitable thickener and in which conventional preservative additives and flavourings have also been incorporated, and c) a final emulsion is prepared by emulsifying the starting emulsion specified under a) and the aqueous composition comprising thickener specified under b), the temperature being maintained in the range from 40°-70° C. during the formation of the final emulsion. The amount of preservative additives in the second aqueous composition under b) is chosen such that this is sufficient to yield a concentration thereof in the aqueous phase, formed from the first aqueous composition and the second aqueous composition, in the final emulsion, whereby the spread formed therefrom after cooling is microbiologically stable.

The effect achieved by initially forming a starting emulsion using a first protein-containing aqueous composition and a suitable fat composition as the starting materials is that the fat composition exerts a shielding effect in respect of the protein which is present in the individual aqueous phase droplets in said emulsion. The aqueous phase is then supplemented by an aqueous composition thickened by means of a thickener; the fat content of the total spread can be brought to the desired value by selecting the amount of thickened aqueous composition. Despite the fact that an entirely molten fat phase and a warm aqueous composition which comprises a suitable thickener are used, although the temperature during the formation of the final emulsion can be between 40° and 70° C., no adverse affect on the protein component present in the spread is observed; it is assumed that the shielding of the protein in the aqueous phase of the starting emulsion is so effective that no damage to the proteins occurs.

The fact that it is not necessary to apply rigorous temperature control, while, moreover, normal equipment can be used, is an important advantage compared with the prior art.

With regard to the fat content in the spread, it is pointed out that the method can be used for mixtures containing up to 85% fat; a conventional range is 10-85% fat; spreads containing 19-65% fat are preferably prepared.

In particular, in the method according to the invention the entirely molten fat composition can be at a temperature of between 55° and 70° C., while the starting emulsion formed therewith may have a temperature of 50°-70° C., as long as the temperature is at least 5° C. higher than the melting point of the fat composition. The second aqueous composition comprising thickener is pasteurized and brought to a temperature of between 40° and 70° C., while during the formation of the final emulsion the temperature is maintained in the range from 55° to 70° C. After forming the final emulsion, the emulsion is then cooled and packaged. The resulting product is found to have a very good microbiological stability and has outstanding melt-off and spreadability.

The effect achieved by using a molten fat composition as the starting material and also forming the final emulsion at a temperature which is higher than the melting point of the fat constituent having the highest melting point is that the aqueous phase of the starting emulsion combines with the second aqueous composition with the formation of a single aqueous phase of which all emulsion droplets essentially have the same composition.

The preservative additives present in the second aqueous composition are thus uniformly distributed over all emulsion droplets, as a result of which a good microbiological stability is obtained. In this context preservative additives are understood to be neutral substances such as salt and acid compounds such as lactic acid and sorbic acid.

It has been found that very good results are obtained if the protein to thickener weight ratio in the aqueous phase of the final emulsion is 1:≧10.

In connection with the invention reference is also made to EP-A-0 297 690 in which a method is described for the formation of a spread having a fat content lower than that of butter or margarine. The starting material in EP-A-0 297 690 is a plastic dispersion, such as butter, which consists of a continuous fat phase and a discontinuous aqueous phase, the aqueous phase consisting of unmodified butter serum, which is mixed with an aqueous composition which has been thickened with a thickener and which is free from lactoprotein and soya protein, and after which the mixture thus formed is processed to form a final emulsion at a temperature at which the fat phase of the plastic dispersion remains plastic. It is stated in the description of the application that if the temperature is allowed to rise for a prolonged period during processing, so that the fat is no longer plastic and all crystallized fat has essentially melted, it is not possible to obtain a suitable product by continuing with processing of the mixture with cooling in order to achieve complete crystallization of the fat.

In the present application, as will be discussed in more detail below, a starting emulsion is first prepared which consists of a continuous fat phase and a discontinuous aqueous phase which, instead of an unmodified serum, contains an aqueous composition containing protein not originating from butter, such as skimmed milk or a milk powder solution. The starting emulsion is subsequently emulsified with a second aqueous composition which contains a thickener. It has now been found that it is possible to use temperatures at which all of the fat composition is in the molten state and with which an excellent product is still obtained after cooling to a temperature which is suitable for allowing the fat to recrystallize. The need for strict temperature control is therefore dispensed with in the method according to the present invention.

The protein-containing aqueous composition for the formation of the starting emulsion can comprise various products, but is advantageously chosen from pasteurized, skimmed or full-fat milk; buttermilk; a solution of milk powder; yoghurt; kefir; curds; a solution of whey powder; a solution of sodium caseinate; soya milk, etc.

Thickeners are understood to be thickeners in the narrower sense, and also gelling agents, which can be chosen from gelatine, agar agar, pectin, modified or unmodified starch, locust bean flour, xanthan gum or combinations of such agents.

The emulsifier incorporated in the fat phase is preferably chosen from a) monoglycerides and optionally diglycerides of mono- or polyunsaturated fatty acids having a C16 to C18 chain or monoglyceride derivatives esterified with nutrient acids, b) polyglycerol esters of unsaturated fatty acids, and c) mixtures of monoglycerides/diglycerides and polyglycerol esters, while the aqueous composition for forming the starting emulsion is free from deflocculating agent.

A suitable polyglycerol ester is polyglycerol esterified with polyricinoleic acid.

It has been found that the monoglyceride and optionally diglyceride-type emulsifier containing an unsaturated chain, which in general is particularly suitable for the preparation of margarines having a low protein content (less than 1.0%), performs equally well here for higher protein contents; for example for protein contents between 0.5 and 10% by weight, based on the total weight of the spread.

Polyglycerol ester-type emulsifiers also show an outstanding effect when carrying out the method of the invention.

A very good effect is obtained if mixtures of an unsaturated monoglyceride/diglyceride emulsifier and polyglycerol esters of polyricinoleic acid are used. Mixtures of this type are in particular advantageous in the preparation of spreads having a relatively low fat content, for example 10-40% by weight.

The weight ratio of monoglyceride/diglyceride-type emulsifier to polyglycerol ester-type emulsifier is preferably 1:1; the total amount can be 0.5-1% by weight, based on the spread.

The invention also relates to a method for the preparation of a spread having a low fat content by emulsifying a thickened aqueous composition containing conventional ingredients in an emulsifier-containing fat composition under conventional conditions.

It has been found that the use of the abovementioned mixtures of emulsifiers and specifically of an unsaturated monoglyceride/diglyceride emulsifier and a polyglycerol ester of polyricinoleic acid also gives good results in methods which deviate from the method according to the invention described above but which still fall within the spirit and scope of the method according to this invention.

Mixtures of this type are likewise found to permit surprisingly good emulsion formation, especially when forming spreads having relatively low fat contents, for example 10-40% by weight, using conventional techniques, with hardly any stability problems being observed.

In particular a weight ratio of 1:1 is outstandingly suitable: the mixture of emulsifiers is suitably used in an amount of 0.5-1.0% by weight, based on the finished spread.

The invention also relates to an installation or apparatus for forming an emulsion of the water-in-oil type, comprising fat composition metering means for metered feeding of a fat composition and the ingredients dissolved or dispersed therein, aqueous composition metering means for metered feeding of an aqueous composition, to be emulsified with the fat composition, and the ingredients dissolved or dispersed therein, mechanical means for forming the emulsion, and optionally heat transport means for heating or cooling of feed or product streams. The installation is characterized in that the fat composition metering means interact with feed means for a first aqueous composition and starting emulsion-forming means are present for preparing a starting emulsion from the fat composition and the first aqueous composition. The installation is further characterized in that the aqueous composition metering means comprise feed means for feeding a second aqueous composition comprising thickener, while final emulsion-forming means are present for forming a final emulsion from the starting emulsion formed and the second aqueous composition.

An installation of this type can be constructed for either batch-wise or continuous operation.

BRIEF DESCRIPTION OF THE DRAWING

The single figure is a schematic of the installation according to the invention which is suitable for carrying out the method according to the invention.

DETAILED DESCRIPTION OF THE PREFERRED EMBODIMENT

The installation according to the invention described for this purpose will now be illustrated with reference to the single figure, in which 1 designates feed means for feeding a suitable molten fat composition and 2 designates feed means for a protein-comprising aqueous composition. The fat composition and the protein-comprising aqueous composition can be prepared elsewhere and brought to the desired temperature elsewhere. In the figure the feed means have in this case been drawn as receiving vessels; of course, the fat composition and the protein-comprising aqueous composition can also be supplied continuously by means of tube lines to the starting emulsion-forming means 3, which here are embodied by a mixing chamber and a mixer. If the residence time in the starting emulsion-forming means 3 is suitably chosen, a starting emulsion is obtained in which the fat phase is still in the fluid state. A storage vessel 5 contains the second aqueous composition thickened with a thickener, which is also warm; the temperature is adjusted after prior pasteurization of the aqueous thickener solution. Via lines 4 and 9, streams are fed from vessel 2, which contains the starting emulsion, and from vessel 5, which contains the aqueous thickener-containing composition, to a twin-head metering pump 6 which combines these streams of said fluids in the emulsifying head 7, from which a homogenized product stream 8 can be withdrawn. As a consequence of emulsifying the second aqueous composition in the starting emulsion at a temperature such that no crystalline fat is present, the final emulsion contains a single homogeneous aqueous phase in which all emulsion particles essentially have the same composition. The product stream 8 is subsequently cooled, for example in a scraped heat exchanger (votator), and finally packaged, the product temperature being set, for example, to 12° C.

The invention will now be illustrated in more detail with the aid of eleven illustrative embodiments which are shown in the following table. Tests carried out:

melting point 32° C.

Examples G to L

85% by weight sunflower oil
10% by weight hydrogenated palm oil ⎫ transesterified
5% by weight hydrogenated palm ⎬ as a mixture with
kernel oil ⎭ one another The hardness values for these mixtures are as follows:

NMR 10° C. 10–30
NMR 20° C. 5–15
NMR 30° C. 1–5

EXAMPLE A

The milk powder was dissolved in water and the solution (first aqueous composition) was added to a completely fluid fat mixture into which an emulsifier had been incorporated; the temperature of the fat mixture was 55° to 65° C. By means of mixing, a water-in-oil emulsion having a water content of between 15 and 20% is obtained; this emulsion is termed starting emulsion. The emulsifier used was an unsaturated monoglyceride type, such as, for example, Admul 6404. This emulsifier is in general particularly suitable for the preparation of halvarines (low fat margarines) having a low protein content (below 1.0%). The second aqueous composition comprises a solution of salt, sorbic acid, gelatine, lactic acid and water having a pH of 3.5 to 4.0. The gelatine used had a bloom index of 280. The gelatine solution is pasteurized and then brought to a temperature of 50° to 55° C.

Via a twin-head metering pump, metered quantities of the starting emulsion and the second aqueous composition are now pumped together into an emulsifying tank in such a way that the fat content in the final emul-

|  |  | A | B | C | D | E | F | G | H | I | K | L |
|---|---|---|---|---|---|---|---|---|---|---|---|---|
| starting emulsion | Fat mixture | 39 | 39 | 39 | 39 | 39 | 39 | 19 | 19 | 19 | 19 | 19 |
| | Monoglyceride/diglyceride | 0.5 | 0.5 | 0.5 | 0.5 | 0.5 | 0.25 | 0.5 | 0.5 | 0.5 | 0.5 | 0.5 |
| | Polyglycerol ester | | | | | | 0.25 | 0.5 | 0.5 | 0.5 | 0.5 | 0.5 |
| | Water | 6 | 5 | | | 6 | | | | | | 7.5 |
| | Skimmed milk powder solution (10% solids) | 4 | 5 | | | | 10 | | 4.5 | | 12 | |
| | Whey powder solution (10% solids) | | | 10 | | | | 20 | | | | 2.5 |
| | Yoghurt | | | | 10 | | | | | 25 | | |
| | Na caseinate solution (10% solids) | | | | | 4 | | | | | | |
| thickened aqueous composition | Water | 48.1 | 47.9 | 46.1 | 46.7 | 45.7 | 46.7 | 49 | 64.3 | 44.5 | 64.5 | 59.1 |
| | Gelatine BL. 260 | 1.6 | 1.4 | — | 3 | 3 | 3 | 3.5 | | 3.5 | 2.5 | |
| | Xanthan gum | — | 0.2 | 0.3 | — | 0.2 | — | — | — | — | | |
| | Locust bean flour | — | 0.2 | 0.3 | — | 0.2 | — | — | — | — | | |
| | Native starch | — | — | — | — | — | — | — | 2 | — | | 3 |
| | Enzyme-modified starch DE = 1 | — | — | — | — | — | — | 6.5 | 8 | 6.5 | | 7 |
| | Salt | 0.6 | 0.6 | 0.6 | 0.6 | 1.2 | 0.6 | 1.0 | 1.0 | 0.5 | 0.6 | 0.6 |
| | Lactic acid | 0.1 | 0.1 | 0.1 | 0.1 | 0.1 | 0.1 | 0.1 | 0.1 | — | 0.25 | 0.15 |
| | Sorbic acid | 0.1 | 0.1 | 0.1 | 0.1 | 0.1 | 0.1 | 0.1 | 0.1 | 0.1 | 0.1 | 0.1 |
| | Gelatine BL 80 | — | — | 3 | — | — | — | — | — | — | | |
| | Flavourings | 0.003 | 0.003 | 0.003 | 0.003 | 0.002 | 0.003 | 0.001 | 0.002 | 0.001 | 0.05 | 0.05 |

NB: protein content of skimmed milk powder and yoghurt is approximately 35% by weight based on the solids content. In the case of whey powder, the protein content is ±13% by weight, based on the solids content.

The fat composition used had the following composition:

Examples A to F

50% by weight sunflower oil
10% by weight palm oil
40% by weight hydrogenated soya oil, sion is 40% by weight. In this way a delayed build-up of the halvarine emulsion is achieved, the final temperature being 55° C. The final emulsion is completely fluid and contains no solid fat particles. The fluid halvarine emulsion is then cooled via a scraped heat exchanger (votator) and packaged; the final temperature of the product is 12° C. The product thus obtained was found

EXAMPLE B

The starting emulsion was virtually identical to that of A but contained somewhat more protein. A mixture of xanthan gum and locust bean flour was now also added to the aqueous phase. A product was obtained which had a stability which on spreading was inferior to that of the product from Example A.

EXAMPLE C

The starting emulsion now contains whey powder.

Compared with tests A and B, a low-bloom gelatine was now added to the aqueous phase; the bloom index of the gelatine was 80 with a gel melting point of below 22° C. added in a combination with xanthan gum and carob bean flour. The ultimate gelling power appears to be poorer than in the case of the product from Examples A and B; the product has a moderate spreadability with a less smooth melt-off than the product from tests A and B.

EXAMPLE D

In this case the taste is obtained by using yoghurt as the protein-containing aqueous phase in the preparation of the starting emulsion. The product obtained was outstanding in all respects.

EXAMPLE E

In this case the protein was supplied in the form of a 10% by weight solution of Na caseinate in water.

EXAMPLE F

A mixture of monoglyceride/diglyceride emulsifier and polyglycerol ester was used. The polyglycerol ester was Triodan R90; a polyglycerol esterified with polyricinoleic acid having an iodine number of 72-100. Very rapid emulsion emulsifier types.

EXAMPLES G-L

A mixture of emulsifiers as in Example F was used in all of these examples. The fat phase made up about 20% of the whole.

In Examples G and I a mixture of gelatine Bl 260 and modified starch was used in a second aqueous phase.

In Examples H and L mixtures of native starch and enzymatically modified starch (DE=1) was exclusively used for thickening the aqueous phase.

All products of Examples E-L had good spreadability and melt-off.

Degree of acidity of the aqueous phase of the spreads

In general the pH of the aqueous phase of the spreads can be adjusted in a manner which is known in the prior art.

The pH will usually be between 4.5 and 6.0. The pH of the aqueous phase of the products according to Examples A to I, which is obtained by melting down, can be seen from the following table:

| Example | pH of aqueous phase |
| --- | --- |
| A | 5.1 |
| B | 5.1 |
| C | 5.1 |
| D | 4.5 |
| E | 5.2 |
| F | 5.1 |
| G | 5.0 |
| H | 5.0 |
| I | 4.7 |
| K | 4.5 |
| L | 4.5 |

Reference is made to the following table for a general assessment of the product described by way of examples above.

| | A | B | C | D | E | F | G | H | I | K | L |
| --- | --- | --- | --- | --- | --- | --- | --- | --- | --- | --- | --- |
| Appearance from refrigerator | 8 | 5 | 4 | 10 | 8 | 10 | 10 | 8 | 10 | 10 | 8 |
| Spreadability | 8 | 6 | 5 | 10 | 8 | 10 | 10 | 8 | 10 | 10 | 8 |
| Melt-Off | 8 | 8 | 6 | 10 | 8 | 10 | 8 | 8 | 8 | 8 | 6 |
| Oil separation at room temperature | − | − | + | − | − | − | − | − | − | − | − |

− - none
+ - some
4 - poor
5 - inadequate
6 - adequate
8 - good
10 - excellent

What is claimed is:

1. Method for the preparation of a spread containing a protein and thickener, wherein an emulsion, comprising a continuous fat phase and a discontinuous aqueous phase and in which all of the protein and thickener is present in the aqueous phase, is formed by emulsifying, said spread having a fat content of up to 85% by weight, comprising the steps of:
   a) forming a water-in-oil starting emulsion from a selected, entirely molten, fat composition in which an emulsifier has been incorporated and a suitable first aqueous composition comprising said protein,
   b) forming a warm second aqueous composition which comprises a suitable thickener and additives selected from the group consisting of preservatives and flavourings, and
   c) preparing a final emulsion by emulsifying the starting emulsion specified under a) and the aqueous composition comprising thickener specified under b), wherein
   the water-in-oil emulsion is maintained throughout the method and the temperature being maintained in the range from 40°-70° C. during the preparing of the final emulsion,
   said protein being selected from the group consisting of lactoprotein and vegetable protein,
   and the amount of preservative additives in the second aqueous composition under b) being sufficient to yield a concentration thereof in the aqueous phase, formed from the first aqueous composition and the second aqueous composition, in the final emulsion, whereby the spread formed therefrom after cooling is microbiologically stable.

2. Method according to claim 1 in which the entirely molten fat composition has a temperature of between 55° and 70° C.; in that the starting emulsion formed therewith has a temperature of between 50° and 70° C., but such that the temperature is at least 5° C. higher than the melting point of the fat composition; the second aqueous composition comprising thickener is pasteurized and brought to a temperature of 40°-70° C.;

and during the formation of the final emulsion the temperature is maintained in the range from 55° to 70° C.

3. Method according to claim 1 in which the protein to thickener weight ratio in the aqueous phase of the final emulsion is 1:≧10.

4. Method according to claim 1 in which the protein-containing first aqueous composition for forming the starting emulsion is chosen from the group consisting of pasteurized, skimmed or full-fat milk, buttermilk, a solution of whey powder, a solution of milk powder, a solution of sodium caseinate, yoghurt, kefir, and soya milk.

5. Method according to claim 1 in which the thickener is chosen from the group consisting of gelatine, agar agar, pectin, modified or unmodified starch, locust bean flour, xanthan gum and combinations of such agents.

6. Method according to claim 1, wherein an emulsifier is incorporated in the fat phase which is chosen from the group consisting of:

a) the monoglycerides and optionally diglycerides of mono- or polyunsaturated fatty acids having a C16 to C18 chain or monoglyceride derivatives esterified with nutrient acids, b) polyglycerol esters of mono- or polyunsaturated fatty acids, and c) mixtures of these emulsifiers, while the first aqueous composition for forming the starting emulsion is free from deflocculating agent.

7. Method according to claim 6 in which said emulsifier is an emulsifier mixture of an unsaturated monoglyceride/diglyceride and a polyglycerol ester of polyricinoleic acid.

8. Method according to claim 6 in which the weight ratio in the emulsifier mixture of monoglyceride/diglyceride emulsifier and polyglycerol ester type emulsifier is 1:1.

9. Method according to claim 7 in which the weight ratio in the emulsifier mixture of monoglyceride/dyglyceride emulsifier and polyglycerol ester type emulsifier is 1:1.

* * * * *